(12) United States Patent
Posamentier (10) Patent No.: US 7,432,808 B2
(45) Date of Patent: Oct. 7, 2008

(54) WIRELESS MODULE ENABLED COMPONENT CARRIER FOR PARTS INVENTORY AND TRACKING

(75) Inventor: Joshua D. Posamentier, Oakland, CA (US)

(73) Assignee: Intel Corporation, Santa Clara, CA (US)

(*) Notice: Subject to any disclaimer, the term of this patent is extended or adjusted under 35 U.S.C. 154(b) by 502 days.

(21) Appl. No.: 11/013,648

(22) Filed: Dec. 15, 2004

(65) Prior Publication Data
US 2006/0124752 A1 Jun. 15, 2006

(51) Int. Cl.
*G08B 13/14* (2006.01)
(52) U.S. Cl. .............. 340/572.1; 340/572.5; 340/572.7; 340/572.8; 343/872; 343/873
(58) Field of Classification Search ................ 340/655, 340/572.1, 540, 5.92, 572.5, 572.7, 572.8; 700/116; 235/385; 343/872, 873
See application file for complete search history.

(56) References Cited

U.S. PATENT DOCUMENTS 6,724,308 B2 * 4/2004 Nicholson ................ 340/572.1
6,982,640 B2 * 1/2006 Lindsay et al. .............. 340/540
7,069,100 B2 * 6/2006 Monette et al. ............. 700/116
7,132,926 B2 * 11/2006 Vaseloff et al. ............ 340/5.92
2002/0125997 A1 9/2002 Kashi et al.
2004/0088070 A1 5/2004 Muehl et al.
2006/0022830 A1 * 2/2006 Oggian et al. ............ 340/572.5

FOREIGN PATENT DOCUMENTS

| DE | 100 56 112 A1 | 5/2002 |
| EP | 0 350 179 A1 | 1/1990 |
| EP | 1 223 128 A1 | 7/2002 |
| EP | 1 396 810 A1 | 3/2004 |

OTHER PUBLICATIONS

PCT International Search Report, International Application No. PCT/US2005/045888, Date of Mailing of the International Search Report: Jun. 7, 2006, pp. 1-4.

* cited by examiner

*Primary Examiner*—Davetta W. Goins
(74) *Attorney, Agent, or Firm*—Kacvinsky LLC (57) ABSTRACT

Apparatus, system, and method for wireless module enabled component carrier for parts inventory and tracking are described.

31 Claims, 4 Drawing Sheets

WIRELESS MODULE ENABLED COMPONENT CARRIER FOR PARTS INVENTORY AND TRACKING

BACKGROUND

Radio Frequency Identification (RFID) is one of many identification technologies used to identify objects. The heart of an RFID system lies in an information carrying module also known as a tag. The module functions in response to a coded RF signal received from a base station. In passive RFID systems where the module is powered by the RFID reader itself, the tag communicates by reflecting the incident RF carrier back to the reader. Information is transferred as the reflected signal is modulated by the module according to a particular programmed information protocol.

In harsh manufacturing environments, such as a printed circuit board (PCB) assembly plant, most RFID module implementations generally cannot be used more than once. In these applications, RFID modules are generally embedded within a label, and lack the necessary robustness for reuse. In a PCB assembly plant electronic components are stored in component carriers such as trays and/or reels to be delivered to or stuffed in various PCBs on an assembly line by pick and place-machines. Some conventional trays and reels may use serial numbers and bar codes to identify a particular batch of electronic components contained therein. Once installed in a PCB assembly line system, however, there is no way for a controller to read back actual component serial numbers, quantities, and other metrics associated with the components. Furthermore, conventional RFID module systems used in dynamic assembly lines do not provide a way to store data related to a specific tray or reel and cannot track quantities of components remaining therein except, for example, through remote databases. Thus, there exists the possibility of part stuffing errors—placing the wrong component on a PCB or placing a component in the wrong place on a PCB.

DETAILED DESCRIPTION

Figure 1:
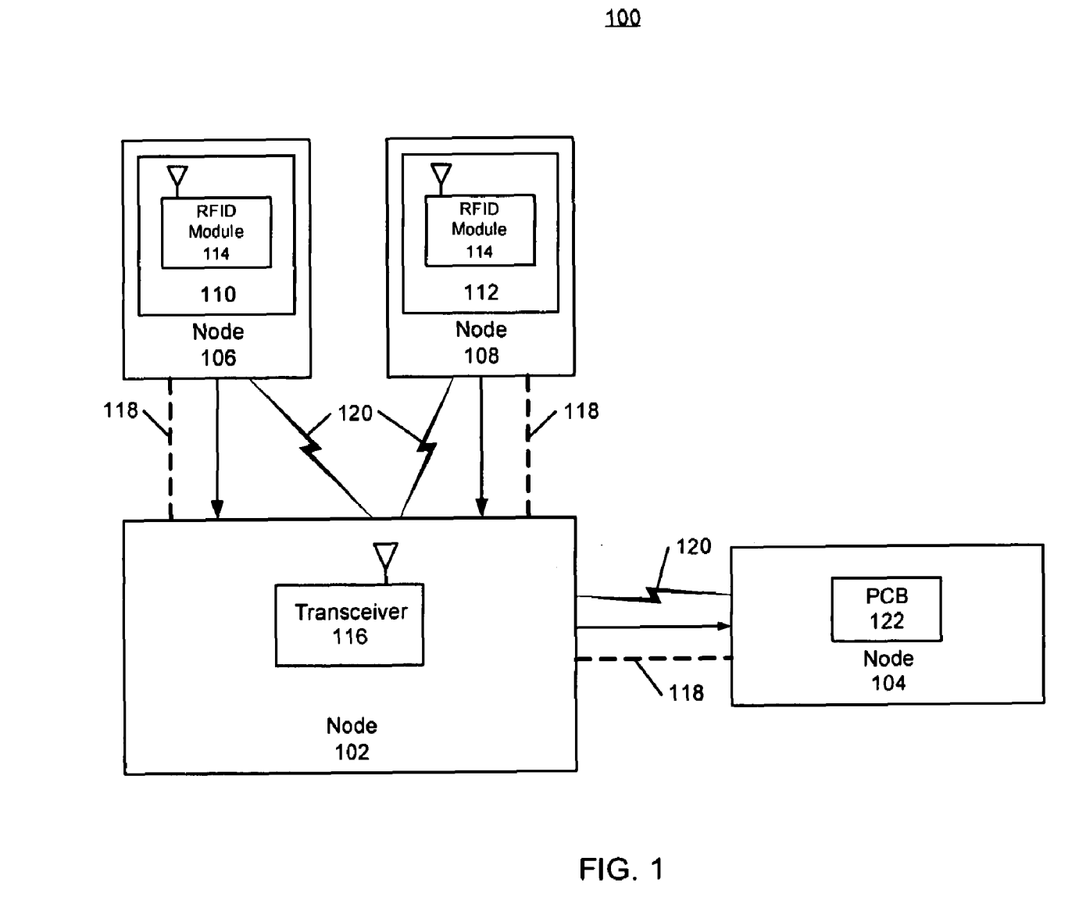
FIG. 1 illustrates a block diagram of a system 100.

FIG. 1 illustrates a block diagram of an assembly system 100. Assembly system 100 may comprise, for example, a communication system having multiple nodes. A node may comprise any physical or logical entity having a unique address in system 100. The unique address may comprise, for example, a network address such as an Internet Protocol (IP) address, a device address such as a Media Access Control (MAC) address, and so forth. Examples of a node may include, but are not necessarily limited to, a computer, server, workstation, laptop, ultra-laptop, handheld computer, telephone, cellular telephone, personal digital assistant (PDA), router, switch, bridge, hub, gateway, wireless access point (WAP), pick-and-place machine operated by a controller, component trays and reels containing communication devices, and so forth. These nodes may include wireless communication modules such as, for example, RFID modules, comprising information associated with components to be assembled on system 100 as well transceivers for reading and writing information to and from the modules. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Media information may be associated with any data representing components, trays, and/or reels containing the components. For example, media information may include tray and reel serial numbers, lots of electronic components, component serial number portions of a module, component part numbers, initial quantity of components located in trays or reels, and real-time updated quantities of components remaining in trays or reels. Control information may refer to any data representing commands, instructions or control words meant for an automated system, such as an assembly line, or more specifically, for example, an automated PCB assembly line. For example, control information may be used to route media information through system 100, or instruct a node to process the media information in a predetermined manner.

The nodes of system 100 may communicate media and control information in accordance with one or more custom or standard protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. The protocol may be a proprietary custom protocol. More specifically, the protocol may be a RFID module communication protocol.

Portions of system 100 may be implemented as a wired communication system, a wireless communication system, or any combination thereof. Although system 100 may be illustrated using a particular communications media by way of example, it may be appreciated that the principles and techniques discussed herein may be implemented using any type of communication media and accompanying technology. The embodiments are not limited in this context.

When implemented as a wireless system, system 100 may include one or more wireless nodes comprising wireless communication modules, such as, for example, RFID modules, interrogators, transceivers, and the like. These wireless nodes may be arranged to communicate information over one or more types of wireless communication media. An example of a wireless communication media may include portions of a wireless spectrum, such as the radio-frequency (RF) spectrum. The wireless nodes may include components and interfaces suitable for communicating information signals over a designated wireless spectrum, such as one or more antennas, wireless transmitters/receivers ("transceivers"), amplifiers, filters, control logic, and so forth. Examples for the antenna may include an internal antenna, an omni-directional antenna, a monopole antenna, a dipole antenna, a lead-frame antenna, an end-fed antenna, a circularly polarized antenna, a patch antenna, a plane-inverted F antenna, a micro-strip antenna, a diversity antenna, a dual antenna, an antenna array, and so forth. The embodiments are not limited in this context.

Referring again to FIG. 1, system 100 may comprise nodes 102, 104, 106, and 108, for example. Although FIG. 1 is shown with a limited number of nodes arranged in a certain topology, it may be appreciated that system 100 may include additional or fewer nodes arranged in any type of topology desired for a given implementation. The nodes 102, 104, 106, and 108 may communicate via wired communication links 118, wireless communication links 120 or any combination thereof, for example. The embodiments are not limited in this context.

In one embodiment, system 100 may comprise node 102. Node 102 may represent, for example, a pick-and-place machine to pick electronic components (e.g., integrated circuits (ICs) and other electronic parts) from trays 110 and reels 112 and place them on PCBs 122 at node 104. Node 102 also may comprise a controller to control one or more operations associated with pick-and-place machines, trays, reels, and assembly lines.

In one embodiment, node 102 may further comprise a communication element. Among other elements and functions, the communication element may include a wireless transceiver 116, for example, to communicate between node 102 and nodes 104, 106, and 108. For example, transceiver 116 may be configured to communicate with one or more wireless modules, such as, for example, RFID modules 114 located throughout a PCB manufacturing plant. In one embodiment, transceiver 116 may communicate with RFID modules 114 at nodes 108 and 110.

System 100 may comprise node 106. In one embodiment, node 106 may represent, for example, an element for dispensing components to the assembly line system of node 104, for example. Node 106 may further comprise one or more objects 110 containing components to be dispensed by the pick-and-place machine. The object 110 may comprise, for example, a reel containing electronic components to be assembled on PCBs 122. In one embodiment, object 110 may further comprise a wireless communication module, such as, for example, an RFID module 114, which may be embedded within the material comprising object 110 and may form an integral part thereof.

System 100 may comprise node 108. In one embodiment, node 108 may represent, for example, an element for dispensing components to the assembly line system of node 104, for example. Node 108 may further comprise one or more objects 112 containing components to be dispensed by the pick-and-place machine. The object 112 may comprise, for example, a component carrier such as a tray containing electronic components to be assembled on PCBs 122 by the pick-and-place machine. The object 112 may comprise, for example, a tray containing electronic components to be assembled on PCBs 122. In one embodiment, object 110 may further comprise an RFID module 114, which may be embedded within the material comprising object 112 and may form an integral part thereof.

System 100 may comprise node 104. In one embodiment, node 104 may represent, for example, an assembly line system interfaced with one or more pick-and-place machines associated with node 102, for example. In one embodiment, the assembly may be configured to assemble PCBs 122. In one embodiment, the PCB assembly line system may be manual, semi-automated, automated or any combination thereof.

In general operation, system 100 may comprise a dynamic assembly line to monitor and update component selection and placement. In one embodiment, system 100 may communicate information between node 102 and nodes 104, 106, and 108 and, at any time, simultaneously read and write information from and to the RFID modules 114 located throughout the system 100. For example, transceiver 116 may read and write information from and to the RFID modules 114 to track the serial number of each object 110, 112 and lots of components contained therein. In one embodiment, portions of each RFID module 114 may be write once or pre-programmed for this function. Transceiver 116 also may read component part numbers stored in RFID modules 114 in objects 110, 112, for example. Transceiver 116 also may read a quantity of components contained in an object 110, 112 and may update the actual quantity of components remaining in each object 110, 112 as they are consumed in the assembly process. The remaining quantity may be stored, for example, in a re-writable portion of RFID module 114 and may be updated in real time by transceiver 116 under control of pick-and-place or machine or dispenser machines.

Figure 2:
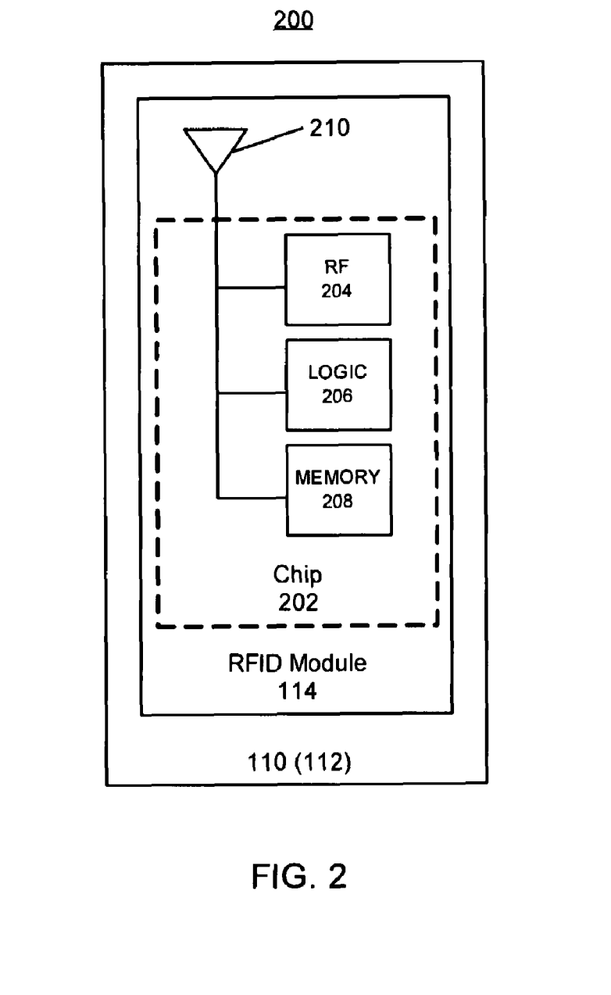
FIG. 2 illustrates a block diagram of objects 110, 112.

FIG. 2 illustrates a block diagram 200 of objects 110, 112 comprising a wireless communication module, such as, for example, RFID module 114. As shown in FIG. 2, objects 110 and 112 each may comprise RFID module 114 comprising multiple elements some of which may be implemented using, for example, one or more circuits, components, registers, processors, software subroutines, or any combination thereof. Although FIG. 2 shows a limited number of elements, it can be appreciated that objects 110, 112 may comprise additional or fewer elements as may be desired for a given implementation. The embodiments are not limited in this context.

In one embodiment, RFID module 114 comprises a semiconductor integrated circuit 202 (IC) that includes radio frequency (RF) circuit 204 connected to antenna 210, logic 206, and memory 208. A specific RFID 114 module may either be ultra high frequency (UHF), Microwave Frequency (μW), or high frequency (HF). Logic 206 may comprise, for example, a processor, controller, state machine, programmable logic array, and the like, and may operate under the control of program instructions. Memory 208 may comprise, for example, program memory, data memory or any combination thereof. Memory 208 also may comprise, for example, random access memory (RAM), read only memory (ROM), programmable read only memory (PROM), erasable programmable read only memory (EPROM), electrically erasable programmable read only memory (EEPROM), combinations thereof, and the like. In one embodiment, memory 208 may be re-writable. RFID module 114 also may comprise antenna 210 connected to RF circuit 202. Those skilled in the art will appreciate that the IC 202 may or may not include RF circuit 204. Often, RF circuit 204 may comprise, for example, a collection of discrete components such as, capacitors, transistors, and -diodes that may be located off the IC 202. Active RFID modules may further comprise a battery. Passive RFID modules have no battery. Rather, they derive their energy from the RF signal used to interrogate the RFID module 114. For example, RFID module 114 may derive and store voltage from a reactive circuit that is responsive to an RF interrogation signal. Such a circuit may comprise, for example, an inductive coil, rectifying circuitry, a storage capacitor, and related circuitry permitting the RFID module 114 to respond to an interrogation signal while present in the present in the electromagnetic field of the interrogation signal. This results in storage on the capacitor of sufficient voltage to power a desired operation of the RFID module 114. In one embodiment, RFID module 114 may be a passive type RFID module. Alternatively, RFID module 114 may comprise a battery for a power source.

In general, RFID module 114 may be manufactured by mounting the antenna 210 element and other individual elements to the IC 202. This may be done by using either short wire bond connections or soldered connections such as ball grid array (bumps) between the semiconductor chip and other circuit elements: RF circuit 202 (e.g., capacitors, diodes, transistors, etc.), antenna 210, logic 206, memory 208, and so forth. Antenna 210 may comprise loops of wire or may be metal etched or plated and soldered or wire bonded to the IC 202. In one embodiment, antenna 210 may comprise, for example, a lead-frame antenna. In one embodiment, IC 202 may be supported by a custom lead-frame which serves as its support and antenna. IC 202 may be either wire-bonded to the lead-frame for the antenna or bumped and flipped onto it prior to over molding. The entire RFID module 114 assembly comprising elements 202, 204, 206, 208 may be embedded in and form an integral part of elements 110, 112 providing a means of physical enclosure. In one embodiment, RFID module 114, including IC 202 and antenna 210, may be injection molded into plastic component carrier such as a device tray or component reel which is molded over passive RFID module 114 including antenna 210. For example, embedding RFID module 114 with a component carrier by injection molding it along with a supportive lead-frame antenna provides a higher degree of reliability and may provide for advanced parts handling and manufacturing control.

Figure 3:
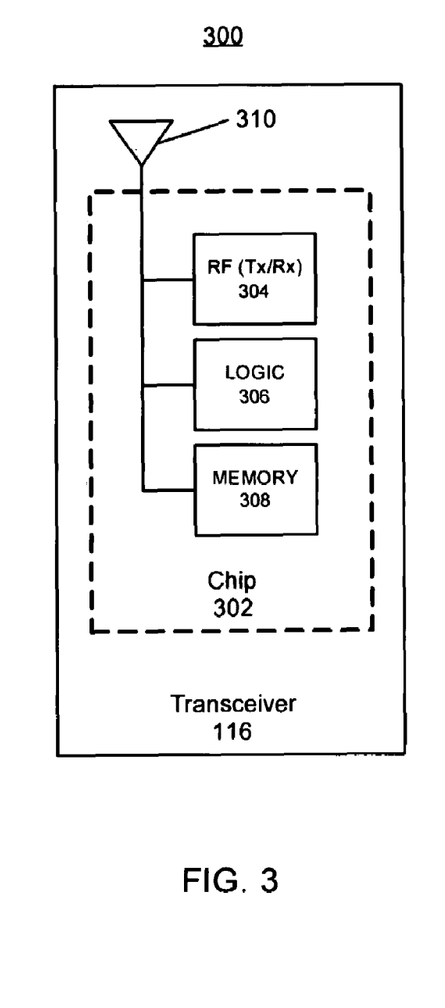
FIG. 3 illustrates a block diagram of element 116.

FIG. 3 illustrates a block diagram 300 of elements comprising transceiver 116. As shown in FIG. 3, transceiver 116 may comprise multiple elements some of which may be implemented using, for example, one or more circuits, components, registers, processors, software subroutines, or any combination thereof. Although FIG. 3 shows a limited number of elements, it can be appreciated that more or less elements may be used for a given implementation. The embodiments are not limited in this context. In one embodiment, transceiver 116 comprises IC 302 that includes RF circuit 304 connected to antenna 310, logic 306, and memory 308. Logic 306 may comprise, for example, a processor, controller, state machine, programmable logic array, and the like, and may operate under the control of program instructions. Memory 306 may comprise, for example, program memory, data memory or any combination thereof. Memory 306 also may comprise, for example, random access memory (RAM), read only memory (ROM), programmable read only memory (PROM), erasable programmable read only memory (EPROM), electrically erasable programmable read only memory (EEPROM), combinations thereof, and the like. RF circuit 302 also may comprise RF transmitter and receiver portions, each comprising, for example, a collection of discrete components such as, capacitors, transistors, diodes, and integrated circuits.

When system 100 wishes to obtain information contained in the wireless communication modules, such as, for example, RFID modules 114, or update information therein, transceiver 116 interrogates the distributed RFID modules 114 by outputting an RF interrogation signal. In accordance with a program stored within a program memory portion of memory 308, logic 306 causes the RF circuit 403 to periodically output an interrogation signal at antenna 310 to interrogate the one or more RFID modules 114 distributed throughout system 100 (FIG. 1). The interrogation signal may be output, for example, at predetermined intervals of 1 ms, for example. By way of example, antenna 310 permits communication of data between transceiver 116 at node 102 and RFID modules 114 at nodes 106, 108 through an electromagnetic fields emitted by transceiver 116 and RFID modules 114. In response to the interrogation signal, received by RFID modules 114 at antenna 210, RFID module 114 logic 206, under control of a program stored within a program memory portion of memory 208, causes RFID modules 114 to output identification data to transceiver 116 at node 102. The identification data may include, for example, serial numbers of each object 110, 112, serial numbers for tracking component lots contained in objects 110, 112, serial number portion of the RFID module 114, part numbers of devices contained in objects 110, 112, quantity of devices, serial numbers or model numbers of pick-and-place or dispenser machines, real-time updates of quantity of devices or components in objects 110, 112, and so forth. Upon receipt of that identification data, transceiver 116 determines whether to take actions to enhance the performance of system 100 or to enhance the dynamic assembly lines and reduce erroneous component selection and placement.

Figure 4:
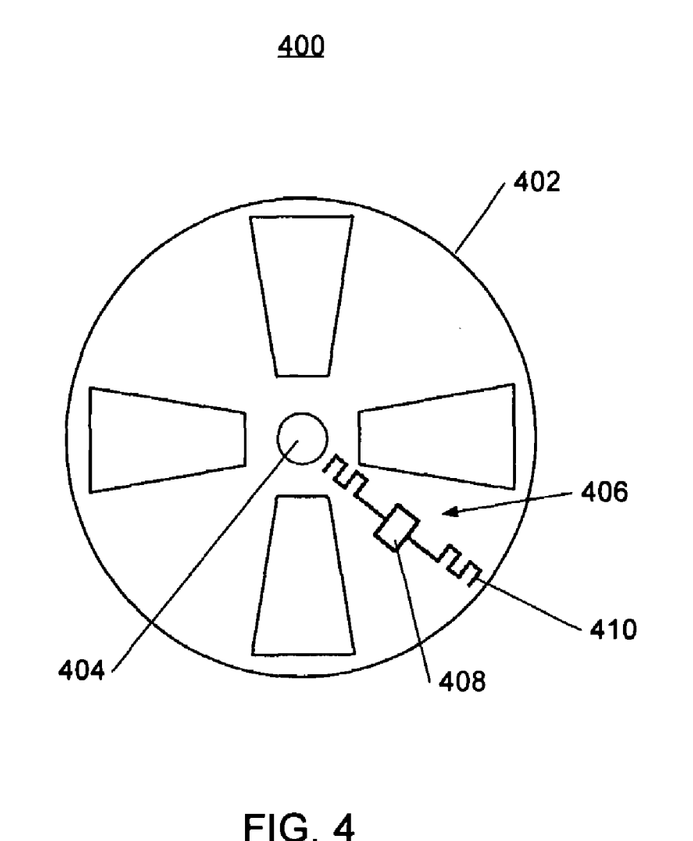
FIG. 4 illustrates a diagram of assembly 400.

FIG. 4 illustrates one embodiment of a tape and reel assembly 400 to carry electronic components. Assembly 400 comprises a reel 402 that carries tape during component feeding. The tape carries a plurality of electronic components to feed to a pick-and-place machine. Reel 402 further comprises an arbor hole 404 for mounting reel 402 on pick-and-place machine. Reel 402 further comprises one embodiment of a passive RFID module 406 to identify information associated with the components. In one embodiment passive RFID module 406 comprises integrated circuit 408 (IC) and lead-frame 410.

Reel 402 may be an injection molded component reel that is over molded over passive RFID module 406 including its lead-frame. In one embodiment, RFID module 406 structure may be embedded within an injection molded reel 402 so that it may easily be cleaned and recycled, for example. One embodiment of an antenna structure comprises a stamped lead-frame antenna that supports the RFID module semiconductor chip during injection over-molding. The semiconductor chip either may be wirebonded or flipped onto this lead-frame antenna structure. The specific RFID module 406 may either be UHF or HF and, in one embodiment, may be re-writable to cover a large number of applications. As shown, IC 408 is supported by custom lead-frame 410, which serves as RFID module's 406 support and antenna. RFID module IC 408 may be either wire-bonded to the lead-frame for the antenna or bumped and flipped onto it prior to over molding. Pick-and-place machines that take reel 402 may be equipped with a single reader, such as transceiver 116 shown in FIGS. 1 and 3, capable of simultaneously reading/writing to a plurality of reels 402 equipped with RFID modules 406 in an assembly environment at any time.

Figure 5:
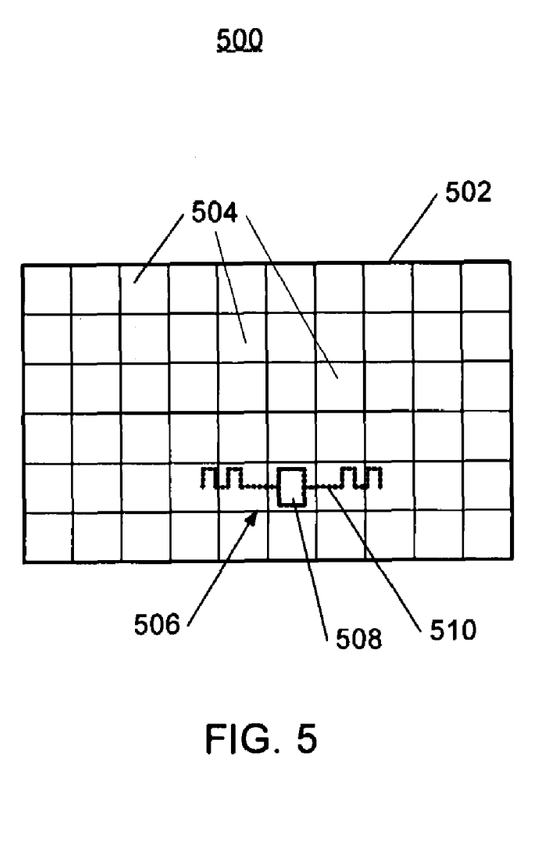
FIG. 5 illustrates a diagram of assembly 500.

FIG. 5 illustrates one embodiment of a device tray assembly 500 to carry electronic components. Assembly 500 comprises a tray 502 that includes a plurality of cells 504 to hold components during feeding. The tray 502 carries a plurality of electronic components to feed to a pick-and-place machine. Tray 502 further comprises one embodiment of a passive RFID module 506 to identify information associated with the components. In one embodiment passive RFID module 506 comprises integrated circuit 508 (IC) and lead-frame 510.

Tray 502 may be an injection molded component tray that is over molded over passive RFID module 506 including its lead-frame. The specific RFID module 506 may either be UHF or HF and, in one embodiment, may be re-writable to cover a large number of applications. As shown, IC 508 is supported by custom lead-frame 510, which serves as RFID module's 506 support and antenna. RFID module IC 508 may be either wire-bonded to the lead-frame for the antenna or bumped and flipped onto it prior to over molding. Pick-and-place machines that take tray 502 may be equipped with a single reader, such as transceiver 116 shown in FIGS. 1 and 3, capable of simultaneously reading/writing to a plurality of trays 502 equipped with RFID modules 506 in an assembly environment at any time. Tray 502 may include any device tray, such as, for example, quad flat package (QFP), ball grid array (BGA) package, quad flat no-lead/micro lead frame (QFN/MLF) package, thin shrink small outline package (TSSOP), and other package types for use in a given pick-and-place machine.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 6:
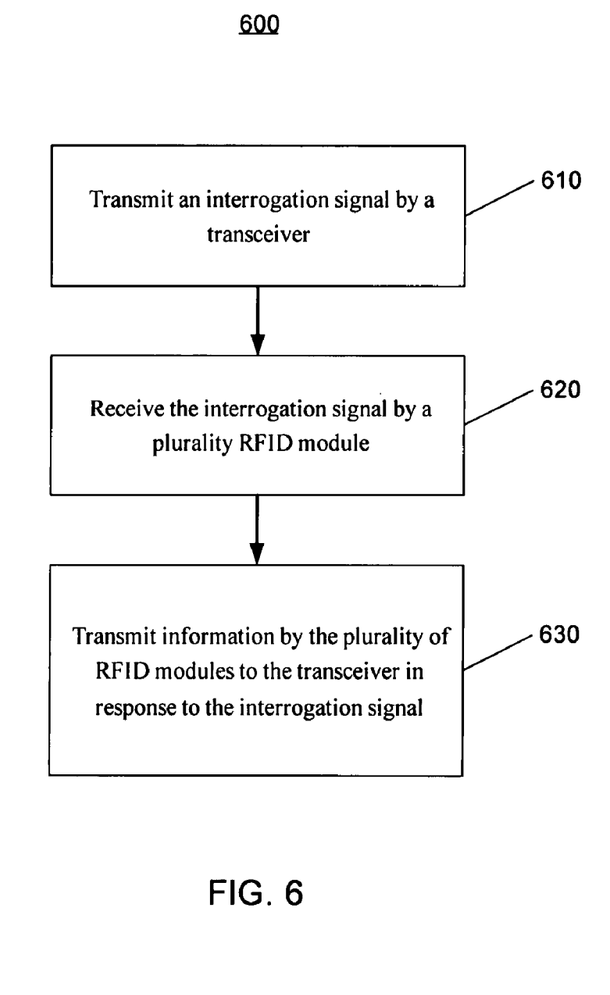
FIG. 6 illustrates a block diagram of a programming logic 600.

FIG. 6 illustrates a programming logic 600. Programming logic 600 may be representative of the operations executed by one or more systems described herein, such as system 100. As shown in programming logic 600, at block 610 the system transmits an interrogation signal with a transceiver. In one embodiment, transmitting an interrogation signal comprises transmitting a plurality of signals. At block 620, the one or more RFID modules distributed throughout the system receive the interrogation signal. At block 630, the one or more RFID modules transmit information to the transceiver in response to the interrogation signal. In one embodiment, the information may be transmitted by the RFID modules simultaneously. Further, in one embodiment, the information may comprise, for example, any of, some, or all of the following: a component carrier serial number; a component serial number; a component part number; a number of components in the component carrier; and a number of components remaining in said component carrier.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a component carrier; and
a wireless communication module embedded in said component carrier, said wireless communication module comprises a semiconductor circuit and a lead-frame antenna connected to said semiconductor circuit, said component carrier comprising an injection molded component reel physically enclosing said wireless communication module.

2. The apparatus of claim 1, wherein said wireless communication module is a RFID module.

3. The apparatus of claim 2, wherein said RFID module comprises a semiconductor circuit.

4. The apparatus of claim 3, wherein said semiconductor circuit comprises a logic circuit comprising information associated with said component carrier and components located in said component carder.

5. The apparatus of claim 4, wherein said information comprises any one of component carrier serial number, component serial number, component part number, number of components in said component carrier, and number of components remaining in said component earner.

6. The apparatus of claim 3, wherein said semiconductor circuit comprises memory.

7. The apparatus of claim 6, wherein said memory is any one of program memory, data memory, random access memory (RAM), read only memory (ROM), programmable read only memory (PROM), erasable programmable read only memory (EPROM), and electrically erasable programmable read only memory (EEPROM).

8. The apparatus of claim 3, further comprising a lead-frame antenna connected to said semiconductor circuit.

9. The apparatus of claim 8, wherein said component carrier comprises an injection molded component reel physically enclosing said RFID module and lead-frame antenna.

10. The apparatus of claim 3, wherein said semiconductor circuit comprises a radio frequency circuit.

11. The apparatus of claim 2, wherein said RFID module is passive.

12. The apparatus of claim 1, wherein said component carrier is formed of plastic.

13. The apparatus of claim 1, wherein said component carrier is a tray.

14. A system, comprising:
 an antenna;
 a wireless transceiver to connect to said antenna;
 a wireless module in communication with said transceiver, said wireless module to include:
 a component carrier;
 a RFID module comprising a semiconductor circuit embedded in said component carrier, said component carrier comprising an injection molded component reel physically enclosing said RFID module; and
 a lead-frame antenna connected to said semiconductor circuit.

15. The system of claim 14, wherein said wireless transceiver comprises a pick-and-place machine.

16. The system of claim 14, wherein said component carrier comprises a tray.

17. The system of claim 14, wherein said component carrier is formed of plastic.

18. The system of claim 14, wherein said semiconductor circuit comprises a logic circuit comprising information associated with said component carrier and components located in said component carrier.

19. The system of claim 18, wherein said information comprises any one of component carrier serial number, component serial number, component part number, number of components in said component carrier, and number of components remaining in said component carrier.

20. The system of claim 14, wherein said semiconductor circuit comprises memory.

21. The system of claim 20, wherein said memory is any one of program memory, data memory, random access memory (RAM), read only memory (ROM), programmable read only memory (PROM), erasable programmable read only memory (EPROM), and electrically erasable programmable read only memory (EEPROM).

22. The system of claim 14, wherein said semiconductor circuit comprises a radio frequency circuit.

23. The system of claim 14, wherein said RFID module is passive.

24. The system of claim 14, wherein said transceiver is configured to read information from said RFID module.

25. The system of claim 24, wherein said transceiver is configured to read information from a plurality of RFID modules simultaneously.

26. The system of claim 14, wherein said transceiver is configured to write information to said RFID module.

27. The system of claim 26, wherein said transceiver is configured to write information to a plurality of RFID modules simultaneously.

28. A method, comprising:
 transmitting an interrogation signal by a transceiver;
 receiving said interrogation signal by a plurality of RFID modules each comprising a semiconductor circuit and a lead-frame antenna connected to said semiconductor circuit; and
 transmitting information by said plurality of RFID modules to said transceiver in response to said interrogation signal, said RFID modules are embedded within an component carrier comprising an injection molded component reel.

29. The method of claim 28, wherein said information comprises any one of component carrier serial number, component serial number, component part number, number of components in said component carrier, and number of components remaining in said component carrier.

30. The method of claim 28, wherein transmitting an interrogation signal comprises transmitting a plurality of signals.

31. The method of claim 28, wherein transmitting information by said plurality of RFID modules, comprises transmitting said information simultaneously.

\* \* \* \* \*

UNITED STATES PATENT AND TRADEMARK OFFICE
CERTIFICATE OF CORRECTION

| | |
|---|---|
| PATENT NO. | : 7,432,808 B2 |
| APPLICATION NO. | : 11/013648 |
| DATED | : October 7, 2008 |
| INVENTOR(S) | : Posamentier |

It is certified that error appears in the above-identified patent and that said Letters Patent is hereby corrected as shown below:

In column 9, line 11, in Claim 4, delete "carder." and insert -- carrier. --, therefor.

In column 9, line 16, in Claim 5, delete "earner." and insert -- carrier. --, therefor.

Signed and Sealed this

Seventh Day of April, 2009

JOHN DOLL
*Acting Director of the United States Patent and Trademark Office*